(12) United States Patent
Tomozawa et al.

(10) Patent No.: US 9,919,735 B2
(45) Date of Patent: Mar. 20, 2018

(54) CONTROL SYSTEM AND CONTROL METHOD FOR VEHICLE

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Motokatsu Tomozawa, Nagoya (JP); Takatomo Asai, Nagoya (JP); Motonari Obayashi, Nagakute (JP); Hironobu Ishijima, Toyota (JP)

(73) Assignees: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 91 days.

(21) Appl. No.: 14/850,131

(22) Filed: Sep. 10, 2015

(65) Prior Publication Data

US 2016/0077525 A1  Mar. 17, 2016

(30) Foreign Application Priority Data

Sep. 12, 2014 (JP) ................. 2014-186780

(51) Int. Cl.

| B62D 6/00 | (2006.01) |
|---|---|
| B62D 15/02 | (2006.01) |
| B60W 30/06 | (2006.01) |
| B60W 10/20 | (2006.01) |

(52) U.S. Cl.
CPC ............ *B62D 6/002* (2013.01); *B60W 30/06* (2013.01); *B62D 15/025* (2013.01); *B62D 15/027* (2013.01); *B62D 15/0285* (2013.01); *B60R 2300/806* (2013.01); *B60T 2201/10* (2013.01); *B60W 10/20* (2013.01); *B62D 6/003* (2013.01)

(58) Field of Classification Search
CPC .............. B62D 15/0285; B62D 15/025; B62D 15/027; B62D 6/002; B62D 6/003; B62D 15/021; B62D 15/024; B62D 6/00; B62D 9/002; B60T 2201/10; B60W 30/06; B60W 10/20; B60W 2520/125; B60R 2300/806; G08G 1/168; G08G 1/167
See application file for complete search history.

(56) References Cited

U.S. PATENT DOCUMENTS

| 6,212,452 B1 * | 4/2001 | Shimizu ................. B62D 1/286 180/168 |
|---|---|---|
| 9,292,471 B2 * | 3/2016 | Fung ..................... B60W 40/09 |
| 2004/0153243 A1 * | 8/2004 | Shimazaki ......... B62D 15/0275 701/300 |

(Continued)

FOREIGN PATENT DOCUMENTS

| JP | 2004-338635 A | 12/2004 |
|---|---|---|
| JP | 2010-195118 A | 9/2010 |

*Primary Examiner* — Jason Holloway
(74) *Attorney, Agent, or Firm* — Sughrue Mion, PLLC

(57) ABSTRACT

A control system for a vehicle includes an electronic control unit. The electronic control unit is configured to acquire first information indicating a situation of the vehicle at the time when the vehicle is traveling, and set a path for guiding the vehicle to a target position on the basis of the first information such that a variation in an inertial force in a lateral direction perpendicular to a traveling direction of the vehicle is smaller than or equal to a first threshold.

5 Claims, 12 Drawing Sheets

(56) References Cited

U.S. PATENT DOCUMENTS

| | | | |
|---|---|---|---|
| 2004/0260439 A1* | 12/2004 | Endo | B60Q 1/48 701/36 |
| 2004/0267420 A1* | 12/2004 | Tanaka | B62D 15/0285 701/36 |
| 2005/0189161 A1* | 9/2005 | Zheng | B62D 6/003 180/402 |
| 2005/0240332 A1* | 10/2005 | Mori | B60T 8/1755 701/72 |
| 2007/0288142 A1* | 12/2007 | Maeda | B62D 1/286 701/41 |
| 2008/0177443 A1* | 7/2008 | Lee | B62D 15/0285 701/41 |
| 2009/0125181 A1* | 5/2009 | Luke | B60C 23/061 701/36 |
| 2009/0132143 A1* | 5/2009 | Kamiya | B60T 7/12 701/96 |
| 2010/0066515 A1* | 3/2010 | Shimazaki | B60W 50/14 340/435 |
| 2010/0259420 A1* | 10/2010 | Von Reyher | B62D 15/028 340/932.2 |
| 2011/0295465 A1* | 12/2011 | Harder | B62D 5/0469 701/42 |
| 2015/0039185 A1* | 2/2015 | Kim | B60W 30/06 701/41 |
| 2016/0001774 A1* | 1/2016 | Nakada | B60W 10/04 701/22 |
| 2016/0257303 A1* | 9/2016 | Lavoie | B60W 30/06 |
| 2017/0088174 A1* | 3/2017 | Inoue | B60T 8/1755 |

* cited by examiner

FIG. 13

| SPEED | 1 | 2 | 3 | 4 | 5 | ... |
|---|---|---|---|---|---|---|
| STEERING SPEED | Vt1 | Vt2 | Vt3 | Vt4 | Vt5 | ... |

CONTROL SYSTEM AND CONTROL METHOD FOR VEHICLE

INCORPORATION BY REFERENCE

The disclosure of Japanese Patent Application No. 2014-186780 filed on Sep. 12, 2014 including the specification, drawings and abstract is incorporated herein by reference in its entirety.

BACKGROUND OF THE INVENTION

1. Field of the Invention

The invention relates to a control system and control method for a vehicle.

2. Description of Related Art

Generally, there is known a technique for steering assist or automatic steering for causing a vehicle to travel along a moving trajectory to a target position in order to guide the vehicle to the target position.

In steering assist or automatic steering for parking a vehicle at a target position, there is suggested a technique for, when a travel trajectory along which the vehicle has actually travelled deviates from a preset travel trajectory, resetting a travel trajectory in order to park the vehicle at the target position (for example, Japanese Patent Application Publication No. 2004-338635 (JP 2004-338635 A), Japanese Patent Application Publication No. 2010-195118 (JP 2010-195118 A)).

However, the existing art is not configured to reset a travel trajectory in consideration of a ride comfort of an occupant. For example, when a travel speed of the vehicle is high and the vehicle is steered by a large amount, a lateral acceleration of the vehicle increases. In this case, an inertial force that acts on an occupant also changes.

SUMMARY OF THE INVENTION

An aspect of the invention provides a control system for a vehicle. The control system includes an electronic control unit. The electronic control unit is configured to acquire first information indicating a situation of the vehicle at the time when the vehicle is traveling, and set a path for guiding the vehicle to a target position on the basis of the first information such that a variation in an inertial force in a lateral direction perpendicular to a traveling direction of the vehicle is smaller than or equal to a first threshold.

A second aspect of the invention provides a control system for a vehicle. The control system includes an electronic control unit. The electronic control unit is configured to acquire first information indicating a situation of the vehicle at the time when the vehicle is traveling and steering angle information in the vehicle, and set a path for guiding the vehicle to a target position such that a variation in a steering angle of the vehicle per unit time is smaller than or equal to a first threshold, and the variation in the steering angle of the vehicle per unit time is determined on the basis of the steering angle information and the situation of the vehicle, indicated by the first information.

Another aspect of the invention provides a control method for a vehicle. The control method includes acquiring first information indicating a situation of the vehicle at the time when the vehicle is traveling; and setting a path for guiding the vehicle to a target position on the basis of the first information such that a variation in an inertial force in a lateral direction perpendicular to a traveling direction of the vehicle is smaller than or equal to a first threshold.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

FIG. 13 is a view that illustrates a table structure of a steering speed storage unit according to the embodiment;

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
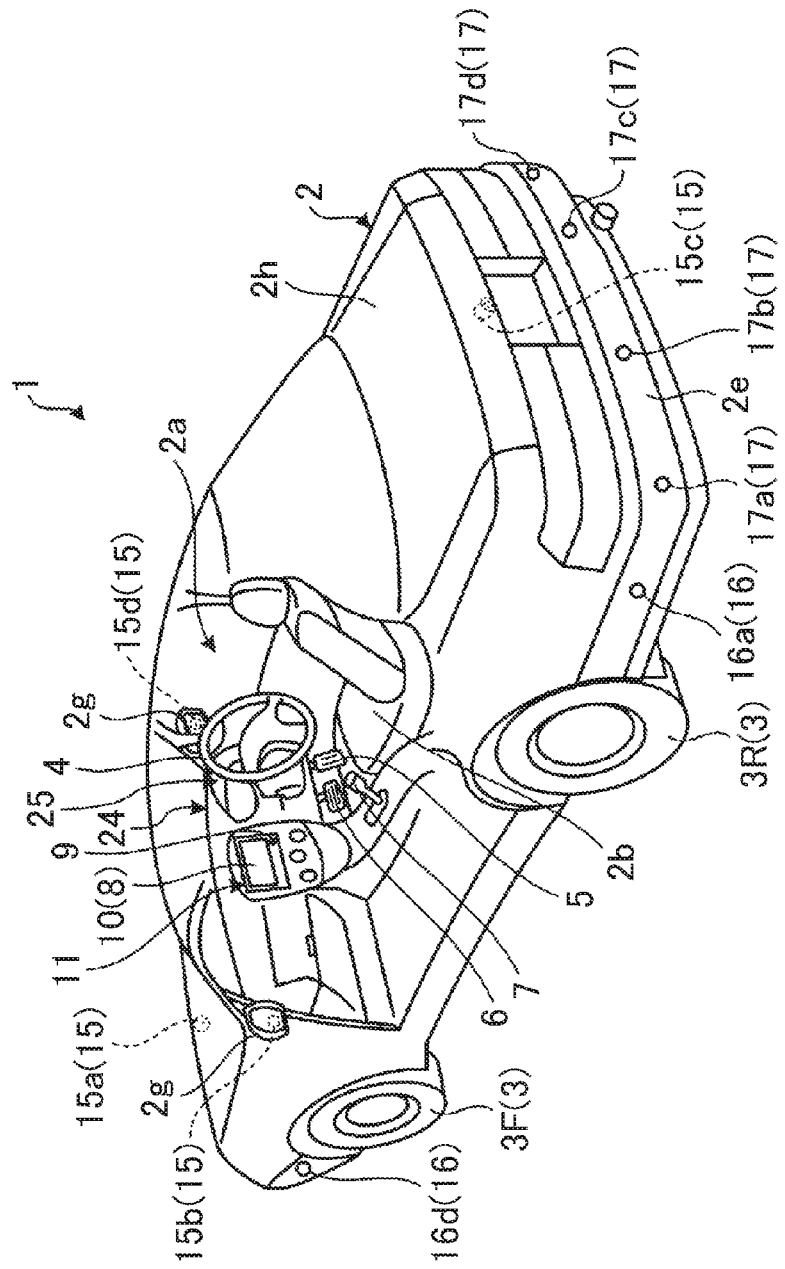

As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an input operation by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system.

Figure 3:
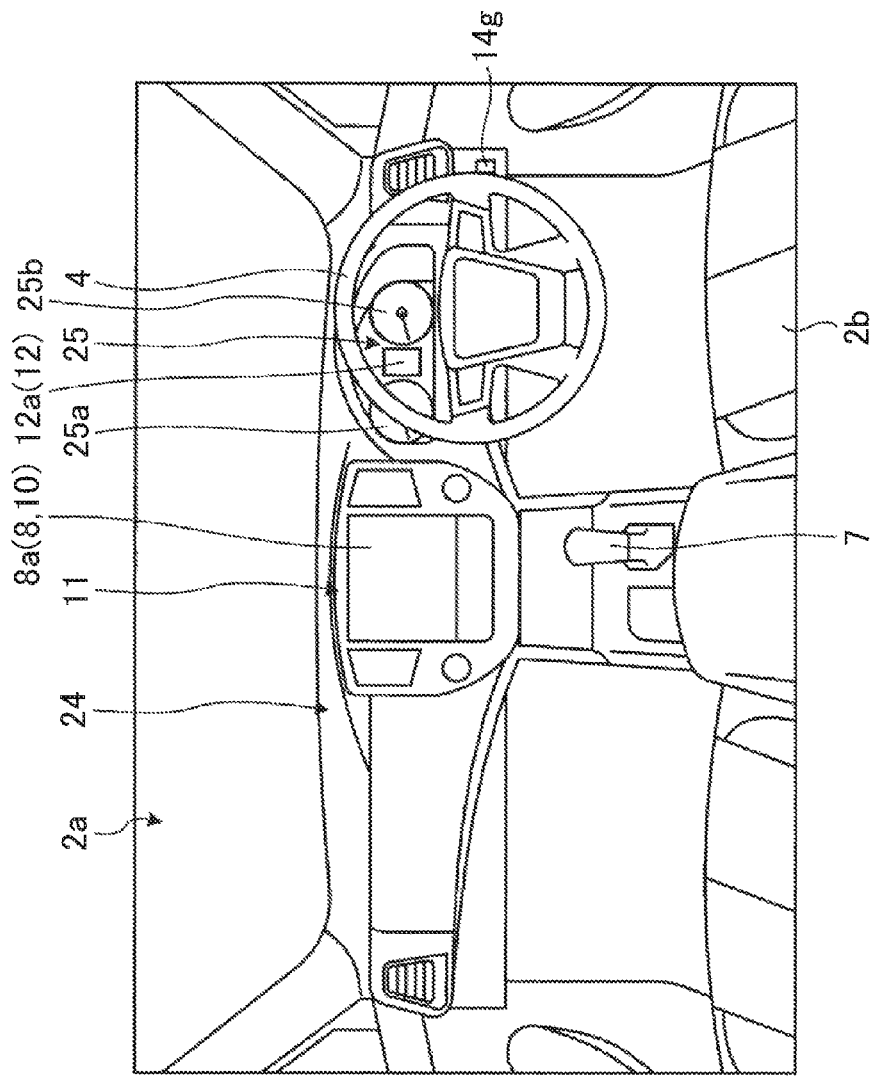
FIG. 3 is a view of an example of a dashboard of the vehicle according to the embodiment when viewed from the rear side of the vehicle.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a (FIG. 3) of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

Figure 2:
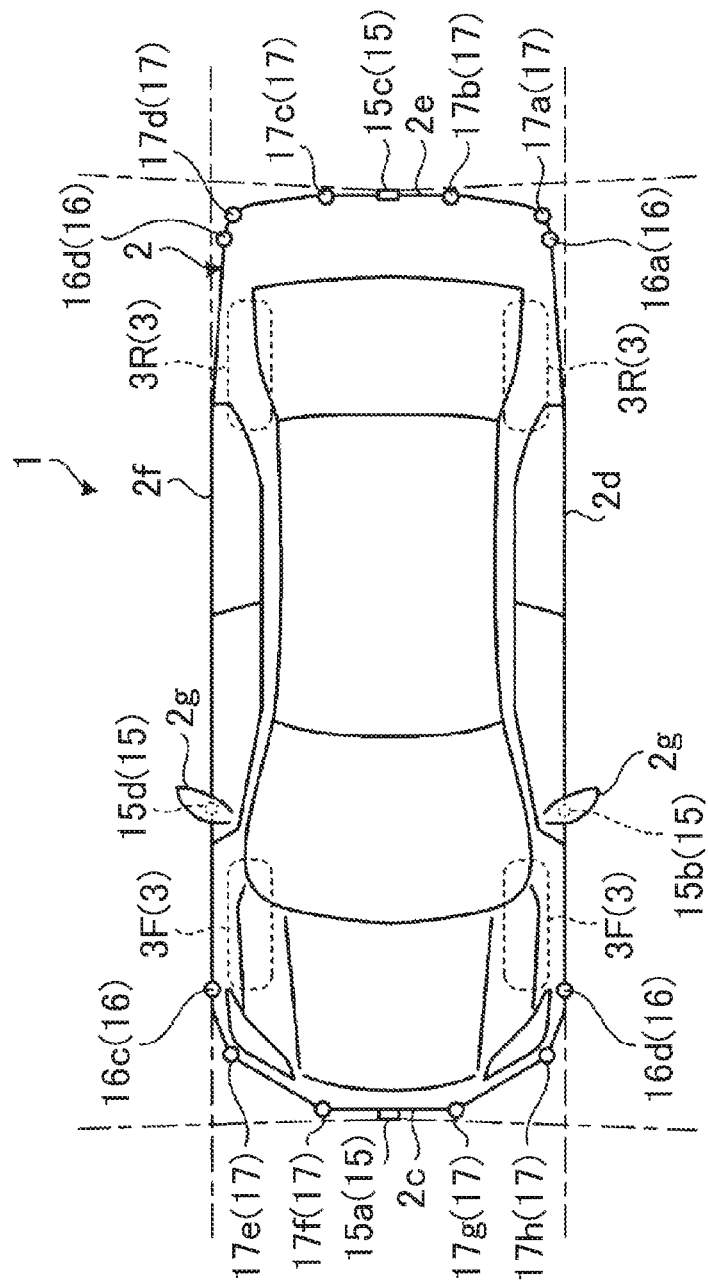
FIG. 2 is an exemplary plan view (bird's-eye view) of the vehicle according to the embodiment.
Figure 4:
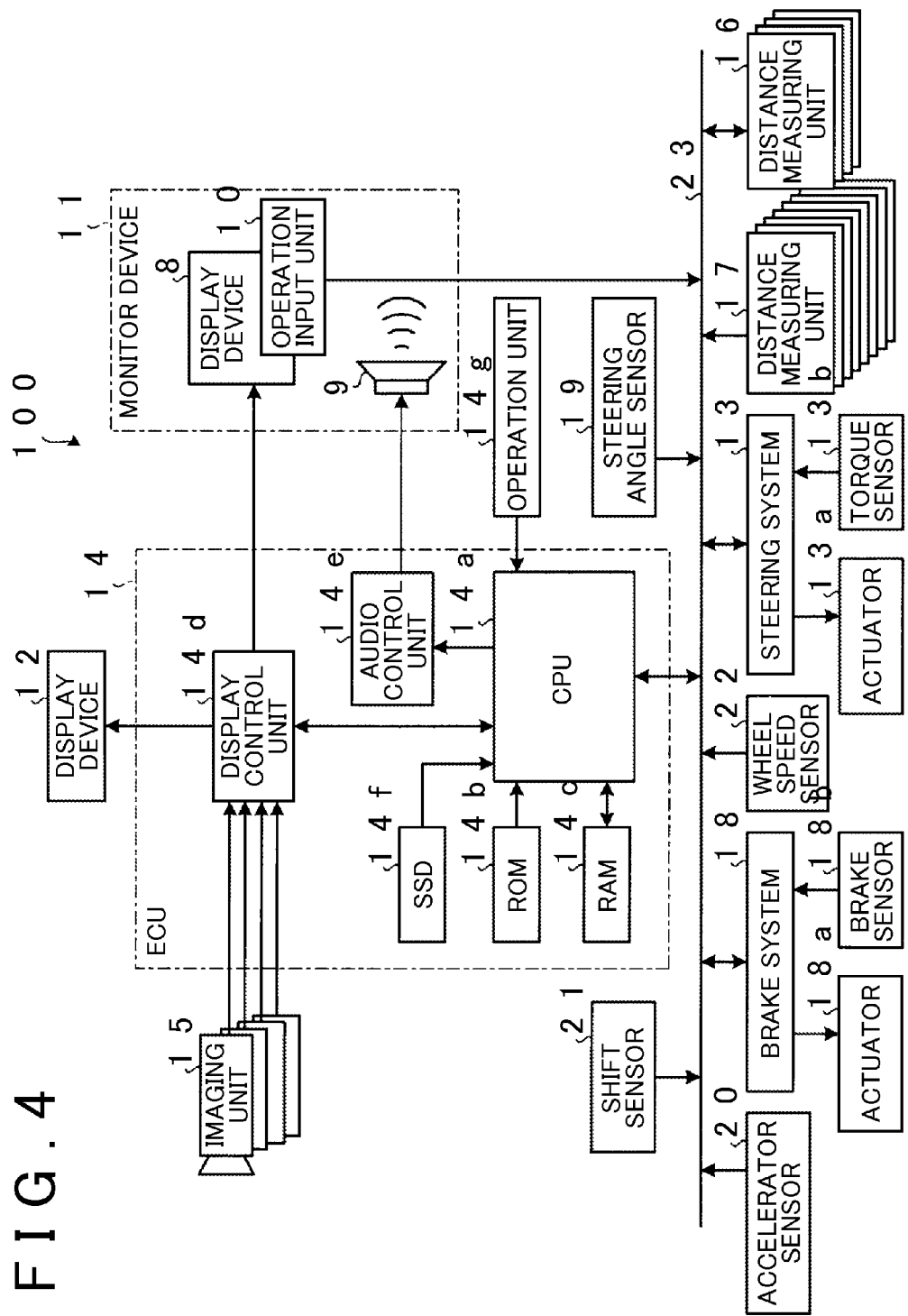
FIG. 4 is an exemplary block diagram of the configuration of a parking assist system according to the embodiment.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable. As illustrated in FIG. 4, the vehicle 1 includes a steering system 13 that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15a is, for example, located at the front of the vehicle body 2, that is, a front end 2c in the vehicle longitudinal direction, and is provided at a front bumper, or the like. The imaging unit 15b is, for example, located at the left side of the vehicle body 2, that is, a left-side end 2d in the vehicle width direction, and is provided at a door mirror 2g that serves as a left-side projecting portion. The imaging unit 15c is, for example, located at a rear end 2e of the vehicle body 2, and is provided at a lower wall portion of a door 2h of a rear boot. The imaging unit 15d is, for example, located at a right-side end 2f of the vehicle body 2, and is provided at a right-side door mirror 2g. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a moving target position of the vehicle 1, computation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, by extension, the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
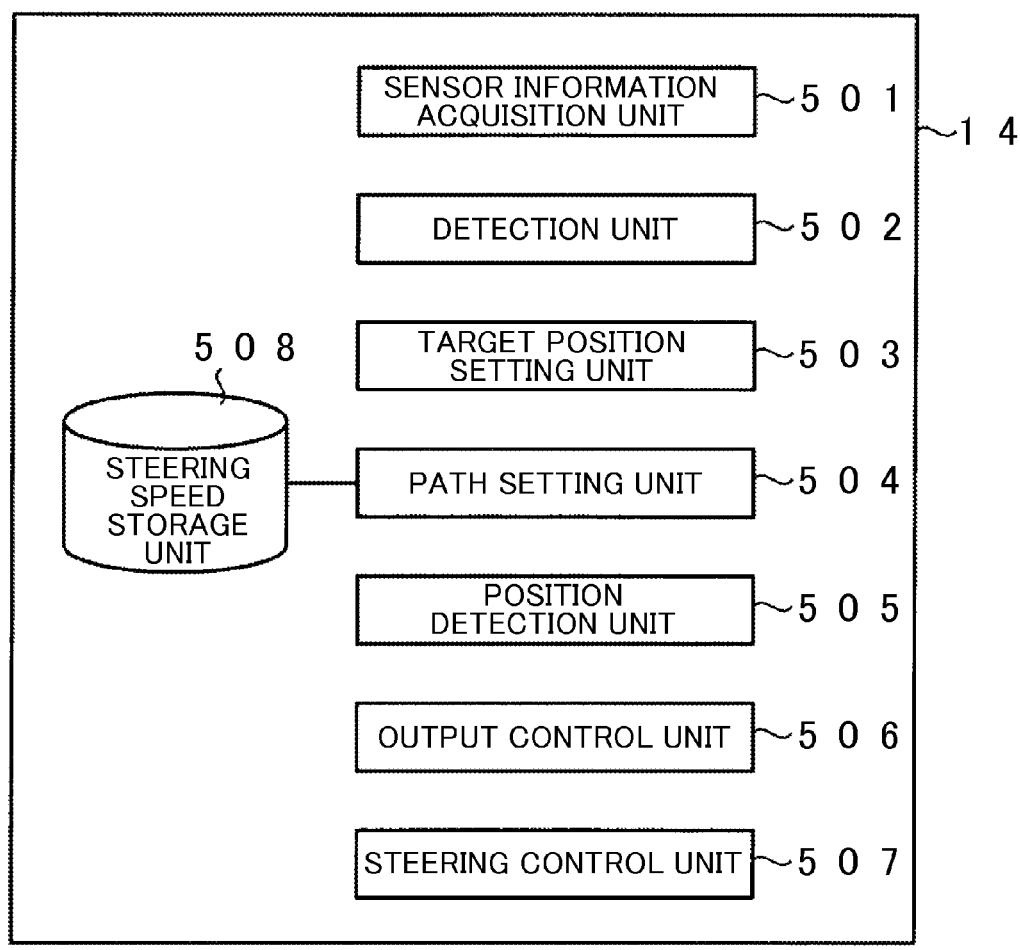
FIG. 5 is an exemplary block diagram of the configuration of an ECU of the parking assist system according to the embodiment.

As shown in FIG. 5, the ECU 14 includes a sensor information acquisition unit 501, a detection unit 502, a target position setting unit 503, a path setting unit 504, a position detection unit 505, an output control unit 506, a steering control unit 507 and a steering speed storage unit 508. The components shown in FIG. 5 are implemented when the CPU 14a of the ECU 14 executes programs stored in the ROM 14b. These components may be configured to be implemented by hardware.

The ECU 14 in the vehicle 1 according to the present embodiment performs parking assist for guiding the vehicle 1 to a target position (for example, a parking position of the vehicle 1). For example, the ECU 14 according to the present embodiment displays guide information on the display device 12 to prompt a driver to operate the accelerator pedal, the brake pedal and the shift operation unit 7. For example, when the driver operates at least one or more of the accelerator pedal and the shift operation unit 7 in accordance with the guide information and then the vehicle 1 has moved, the ECU 14 controls the steering system 13 in accordance with a moved distance of the vehicle 1 such that the vehicle 1 moves along a set moving path. Thus, because steering commensurate with the moved distance is performed, the vehicle 1 is able to move to the target position.

Figure 6:
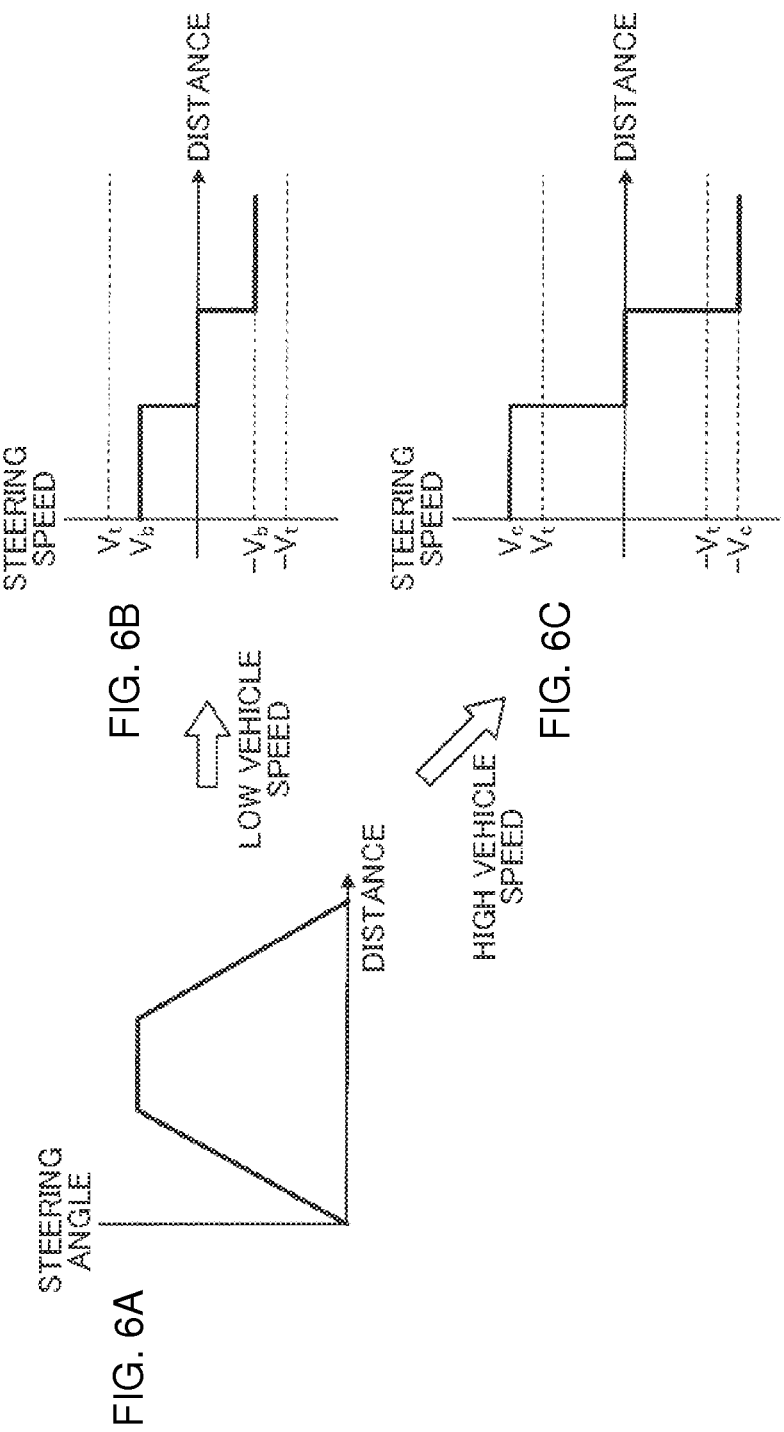
FIG. 6A is a graph that illustrates the relationship between a moved distance and a steering angle in the case where steering control is executed along a moving path in an existing vehicle.
FIG. 6B and FIG. 6C are graphs that illustrate the relationship between a moved distance and a steering speed in the case where steering control is executed along the moving path in the existing vehicle.

FIG. 6A is a graph that illustrates the relationship between a moved distance and a steering angle in the case where steering control is executed along a moving path in an existing vehicle. FIG. 6B and FIG. 6C are graphs that illustrate the relationship between a moved distance and a steering speed in the case where steering control is executed along the moving path in the existing vehicle.

FIG. 6A shows a steering angle set commensurately with a moved distance in order to move the existing vehicle to a target position. In FIG. 6A, a steering angle commensurate with a moved distance for moving the vehicle to the target position is set irrespective of a speed of the vehicle. A control unit of the existing vehicle is able to guide the vehicle to the target position by controlling the steering angle set commensurately with a moved distance.

FIG. 6B is a graph that illustrates a steering speed of the vehicle (a variation in steering angle per unit time, or a temporal differential value of a steering angle) in the case where the vehicle moves at a low speed (for example, 1 km/h) in accordance with a steering angle commensurate with a moved distance in FIG. 6A. When shown in FIG. 6B, the steering speed changes among Vb, 0 and −Vb. Reference steering speeds ±Vt shown in FIG. 6B are predetermined reference steering speeds. It may be recognized that steering speeds ±Vb fall within the range of the reference steering speed −Vt to the reference steering speed Vt. The details of the reference steering speeds ±Vt will be described later.

FIG. 6C is a graph that shows a steering speed of the vehicle (a variation in steering angle per unit time) in the case where the vehicle moves at a high speed (for example, 7 km/h) in accordance with a steering angle set commensurately with a moved distance in FIG. 6A. When shown in FIG. 6C, the steering speed changes among Vc, 0 and −Vc. Vc is higher than Vb. In the example shown in FIG. 6C, the steering speeds ±Vc do not fall within the range of the predetermined reference steering speed −Vt to the predetermined reference steering speed Vt.

In this way, when the steering angle is set commensurately with a moved distance in order to move the vehicle 1 to the target position, the steering speed changes in response to the speed of the vehicle 1 even when the moving path is the same.

Figure 7:
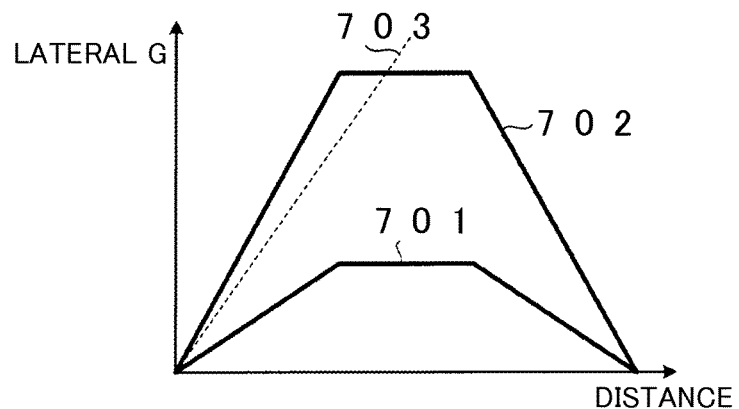
FIG. 7 is a graph that illustrates a lateral acceleration based on a difference in steering speed in the existing vehicle.

FIG. 7 is a graph that illustrates a lateral acceleration G based on a difference in steering speed in the existing vehicle shown in FIG. 6B and FIG. 6C. It is assumed that a lateral G is an inertial force that is generated in a lateral direction perpendicular to the traveling direction of the vehicle 1, hereafter referred to as "a lateral G".

In the example shown in FIG. 7, a transition 701 indicates a lateral G commensurate with a moved distance of the vehicle in the case of the steering speed shown in FIG. 6B (in other words, the case where the vehicle is moving at a low speed). A transition 702 indicates a lateral G commensurate with a moved distance of the vehicle in the case of the steering speed shown in FIG. 6C (in other words, the case where the vehicle is moving at a high speed).

As shown in FIG. 7, although the moving path is the same, the lateral G varies depending on the steering speed. As a variation in lateral G (a temporal differential value of the lateral G) increases, an occupant experiences a discomfort. A transition 703 is assumed to be a transition of a variation Gt in lateral G (hereinafter, referred to as threshold Gt) determined as a reference above which an occupant experiences a discomfort. That is, as the steering speed of the vehicle 1 exceeds the transition 703, the tendency of making an occupant experience a discomfort increases. Because an appropriate value of the threshold Gt varies depending on a mode, the description is omitted.

The ECU 14 according to the present embodiment sets a moving path along which the vehicle 1 is guided to the target position such that the variation in lateral G is smaller than or equal to the threshold Gt (a variation in lateral G does not become larger than the transition 703) in order not to make an occupant experience a discomfort.

As long as the reference steering speed Vt falls within the range of the reference steering speed Vt to the reference steering speed −Vt, the reference steering speed Vt is assumed to be a threshold set such that the variation in lateral G is smaller than or equal to the threshold Gt. In other words, as long as the moving path is set such that the steering speed of the vehicle 1 falls within the range of the reference steering speed (threshold) Vt to the reference steering speed (threshold) −Vt, it is possible to prevent an occupant's discomfort from a lateral G.

The ECU 14 according to the present embodiment repeatedly sets the moving path in response to the current speed of the vehicle 1 at predetermined time intervals such that the variation in lateral G is smaller than or equal to the threshold Gt, that is, the steering speed falls within the range of the reference steering speed Vt to the reference steering speed −Vt.

In the examples shown in FIG. 6A, FIG. 6B and FIG. 6C, the description is made in the case where the x axis represents distance, and the y axis represents steering angle or steering speed. However, the same applies to the case where the x axis represents distance and the y axis represents turning radius instead of steering angle or radial speed instead of steering speed. That is, in order for the lateral G not to exceed the predetermined threshold, the path setting unit 504 may set a moving path such that a radial speed per unit time does not exceed a predetermined threshold. The other process in the case where the radial speed is used is similar to that of the present embodiment, so the description is omitted.

That is, a moving path just needs to be set such that the turning radius increases in order to suppress the steering speed as the current speed of the vehicle 1 increases. Thus, as the speed of the vehicle 1 increases, a distance that the vehicle 1 moves to the target position becomes longer.

Figure 8:
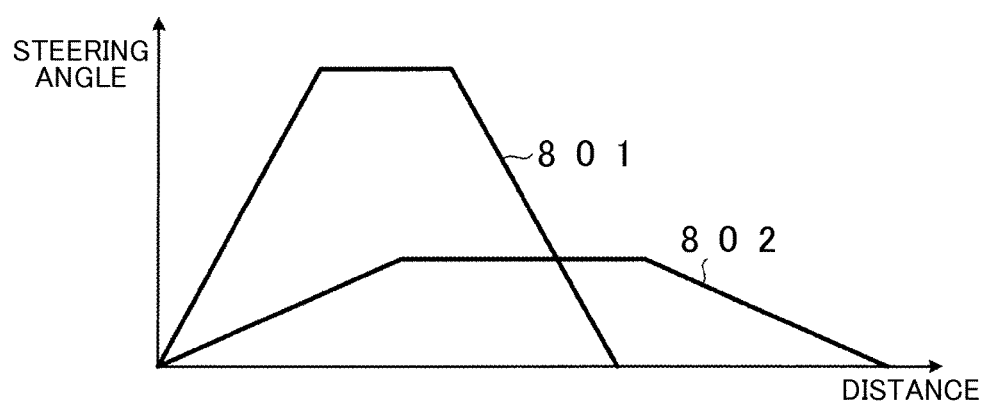
FIG. 8 is a graph that shows a change in steering angle in the case where steering control is executed along a moving path corresponding to a speed in the vehicle according to the embodiment.

FIG. 8 is a graph that shows a change in steering angle in the case where steering control is executed along the moving path set in accordance with the speed in the vehicle 1 according to the present embodiment. In the example shown in FIG. 8, a transition 801 of the steering angle based on the moving path set in the case where the vehicle 1 moves at a low speed (for example, 1 km/h) and a transition 802 of the steering angle based on the moving path set in the case where the vehicle 1 moves at a high speed (for example, 7 km/h) are shown. In the example shown in FIG. 8, the transition 802 in the case where the vehicle 1 moves at a high speed (for example, 7 km/h) is smaller in steering angle than the transition 801 in the case where the vehicle 1 moves at a low speed (for example, 1 km/h), so a distance to reach an intended position increases.

Figure 9:
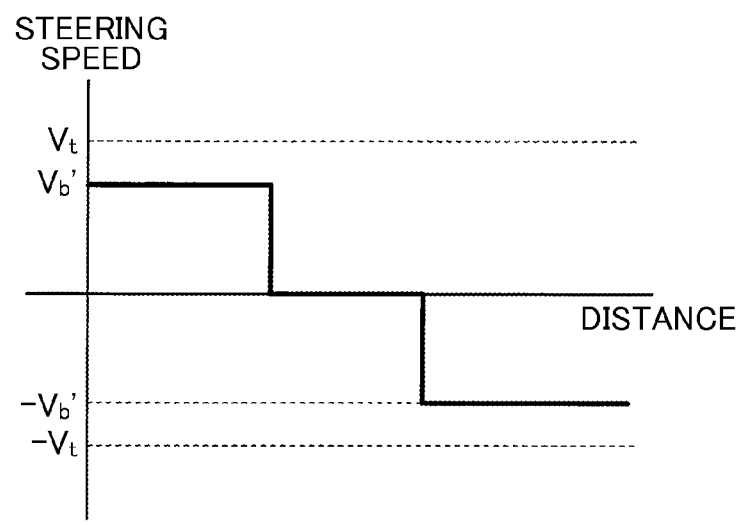
FIG. 9 is a graph that illustrates a steering speed of the vehicle in the case where the vehicle according to the embodiment moves along a moving path set for a low speed.

FIG. 9 is a graph that shows a steering speed of the vehicle 1 (a variation in steering angle per unit time) in the case where the vehicle moves along the moving path set for a low speed (for example, 1 km/h), that is, the case where the vehicle moves in accordance with the steering angle of the transition 801 in FIG. 8. When shown in FIG. 9, the steering speed changes among Vb', 0 and −Vb'. In the example shown in FIG. 9, the steering speed (Vb', 0, −Vb) falls within the range of the reference steering speed Vt to the reference steering speed −Vt.

Figure 10:
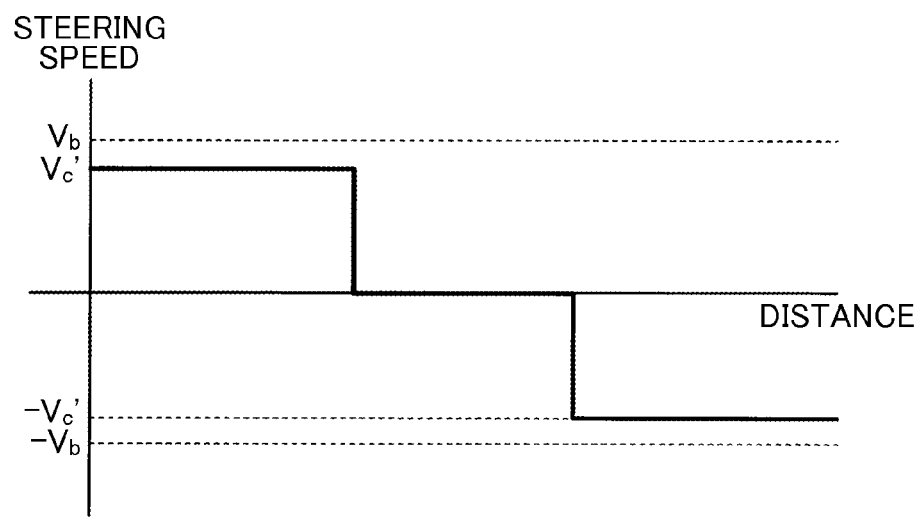
FIG. 10 is a graph that illustrates a steering speed of the vehicle in the case where the vehicle according to the embodiment moves along a moving path set for a high speed.

FIG. 10 is a graph that shows a steering speed of the vehicle 1 (a variation in steering angle per unit time) in the case where the vehicle moves along the moving path set for a high speed (for example, 7 km/h), that is, the case where the vehicle moves in accordance with the steering angle of the transition 802 in FIG. 8. When shown in FIG. 10, the steering speed changes among Vc', 0 and −Vc'. In the example shown in FIG. 10, as well as FIG. 9, the steering speed (Vc', 0, −Vc') falls within the range of the reference steering speed Vt to the reference steering speed −Vt.

Figure 11:
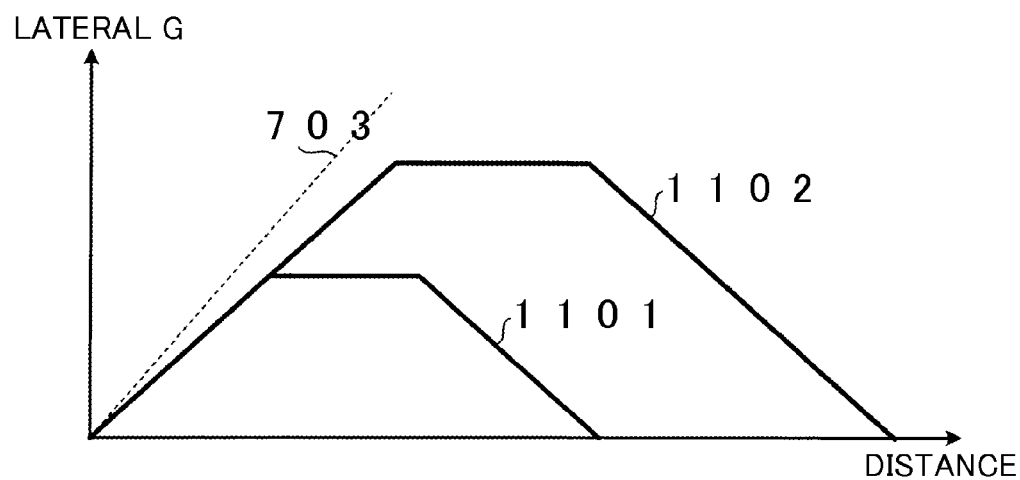
FIG. 11 is a graph that illustrates a lateral acceleration based on a difference in steering speed in the vehicle according to the embodiment.

FIG. 11 is a graph that illustrates a lateral G based on a difference in steering speed in the vehicle 1 according to the present embodiment. In the example shown in FIG. 11, a transition 1101 shows a lateral G commensurate with a moved distance in the case where the vehicle 1 moves along the moving path set for a low speed (for example, 1 km/h), that is, the case where the vehicle 1 moves in accordance with the steering angle of the transition 801 in FIG. 8.

A transition 1102 shows a lateral G commensurate with a moved distance in the case where the vehicle 1 moves along the moving path set for a high speed (for example, 7 km/h), that is, the case where the vehicle 1 moves in accordance with the steering angle of the transition 802 in FIG. 8.

The transition 1101 and the transition 1102 shown in FIG. 11 have a smaller variation in lateral G than the transition 703 that changes at the variation Gt in lateral G determined as the reference above which an occupant experiences a discomfort. Therefore, it may be recognized that an occupant's discomfort is prevented.

In this way, the ECU 14 according to the present embodiment is able to suppress an excessive variation in lateral G generated in the vehicle 1 over the threshold Gt by repeatedly resetting the path in response to the current speed of the vehicle 1, so it is possible to prevent an occupant's discomfort.

Figure 12:
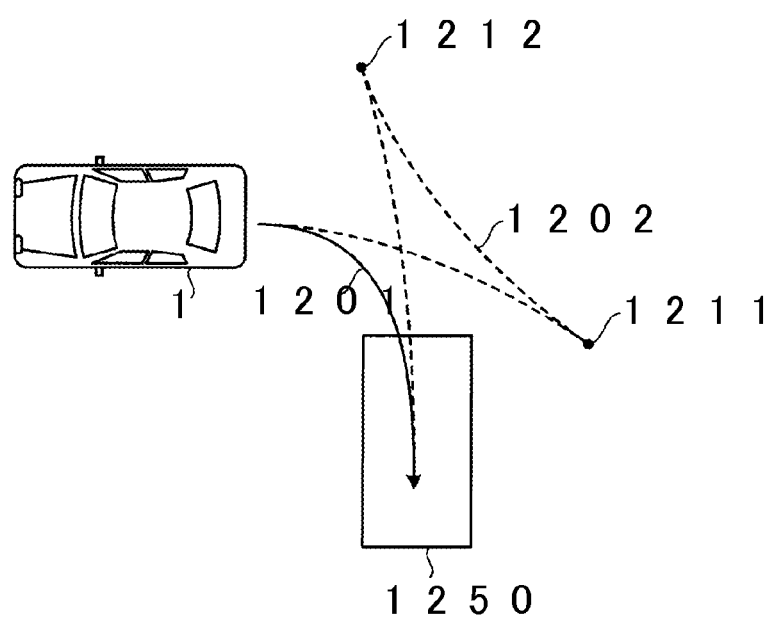
FIG. 12 is a view that shows an example of a moving path set by the ECU according to the embodiment.

FIG. 12 is a view that shows an example of a moving path set by the ECU 14 according to the present embodiment. A moving path 1201 in FIG. 12 is assumed to be a moving path set by the ECU 14 in the case where the vehicle 1 moves at a low speed. A moving path 1202 in FIG. 12 is assumed to be a moving path set by the ECU 14 in the case where the vehicle 1 moves at a high speed.

As shown in FIG. 12, when the variation in lateral G is suppressed in a state where the speed of the vehicle 1 is increased, the turning radius of the vehicle 1 increases. Therefore, depending on a target position (for example, a parking position 1250) to which the vehicle 1 moves, it becomes difficult for the vehicle 1 to move to a destination without turning around. The ECU 14 according to the present embodiment sets switching points 1211, 1212, at which a travelling direction of the vehicle is required to change. Thus, the ECU 14 is able to set a moving path such that the vehicle 1 moves to the target position (for example, parking position 1250) even when the turning radius increases. Referring back to FIG. 5, the components of the ECU 14 will be described.

The sensor information acquisition unit 501 acquires information from various sensors provided in the vehicle 1. The sensor information acquisition unit 501 according to the present embodiment acquires wheel speed information from the wheel speed sensor 22, measured distance information from the distance measuring units 16, 17, steering angle information from the steering angle sensor 19, accelerator information from the accelerator sensor 20, shift information from the shift sensor 21, brake information from the brake sensor 18b, and steering torque information from the torque sensor 13b. The sensor information acquisition unit 501 according to the present embodiment acquires speed information of the vehicle 1 on the basis of the wheel speed information from the wheel speed sensor 22.

The detection unit 502 detects an obstacle around the vehicle 1 on the basis of the measured distance information acquired by the sensor information acquisition unit 501 from the distance measuring units 16, 17. The detection unit 502 detects an area in which the vehicle 1 is allowed to be parked on the basis of the measured distance information acquired by the sensor information acquisition unit 501 from the distance measuring units 16, 17.

The target position setting unit 503 sets a target position that is a destination to which the vehicle 1 moves. The target position setting unit 503 according to the present embodiment sets the target position from among the area in which the vehicle 1 is allowed to be parked, which is detected by the detection unit 502. When there are a plurality of available parking areas, the area selected from among the plurality of available parking areas by the driver via the operation unit 14g is set as the target position.

The path setting unit 504 generates a moving path of the vehicle 1 to the target position set by the target position setting unit 503.

The output control unit 506 outputs guide information to the display device 12 in order to move the vehicle 1 along the set moving path. The guide information is, for example, a guide to change a shift, a guide to depress the brake, a guide to depress the accelerator, or the like.

The position detection unit 505 detects the current position of the vehicle 1. The position detection unit 505 according to the present embodiment detects the current position of the moving vehicle 1 on the basis of the measured distance information, steering angle information, wheel speed information and speed information of the vehicle 1, acquired by the sensor information acquisition unit 501.

The steering control unit 507 executes steering control over the steering system 13 on the basis of the moving path set by the path setting unit 504 and the current position detected by the position detection unit 505 such that the vehicle 1 moves along the moving path.

Thus, the driver executes control, such as depression of the accelerator, change of a shift and depression of the brake, in accordance with the guide information displayed on the display device 12 by the output control unit 506, and the steering control unit 507 executes steering control, with the result that it is possible to move the vehicle 1 along the moving path. Incidentally, in the present embodiment, the driver depresses the accelerator in accordance with the guide information displayed on the display device 12 by the output control unit 506. Therefore, a speed at which the vehicle 1 reaches the target position varies depending on a driver.

The path setting unit 504 according to the present embodiment resets the moving path for guiding the vehicle 1 to the target position on the basis of the speed of the vehicle 1 at predetermined time intervals such that the variation in the lateral G of the vehicle 1 is smaller than or equal to the threshold Gt.

The steering speed storage unit 508 stores an upper limit value of the steering speed in the SSD 14$f$ of the ECU 14 in association with each speed of the vehicle 1. FIG. 13 is a view that illustrates a table structure of the steering speed storage unit 508. As shown in FIG. 13, upper limit values Vt1, Vt2, . . . of the steering speed are set to smaller values as the speed of the vehicle increases. That is, because the steering speed storage unit 508 stores the upper limit value of the steering speed in association with each speed, the path setting unit 504 is able to recognize the upper limit value of the steering speed commensurate with the current speed of the vehicle 1.

The path setting unit 504 resets the moving path based on such a steering angle that does not exceed the upper limit value of the steering speed associated with the current speed of the vehicle 1 by consulting the steering speed storage unit 508. That is, in order for the steering speed not to exceed the upper limit value Vt (in order for the steering speed to be lower than or equal to the threshold), the path is set such that the turning radius of the vehicle when the speed of the vehicle is high is larger than the turning radius of the vehicle when the speed of the vehicle is low. Thus, it is possible to prevent a discomfort experienced by an occupant on the vehicle 1 due to a lateral G.

In the present embodiment, an example in which a moving path is set on the basis of the correlation stored in the steering speed storage unit 508 such that the steering speed does not exceed the upper limit value of the steering speed associated with the speed of the vehicle 1 is described; however, setting of a moving path is not limited to a setting method based on the correlation. For example, it is conceivable to set a steering speed such that the mathematical expression "G (vehicle speed, steering speed)<predetermined threshold" is satisfied.

At the time of setting a moving path, the path setting unit 504 further sets a switching position, at which the traveling direction of the vehicle 1 is required to change, in the moving path where necessary such that the variation in the lateral G of the vehicle 1 (the inertial force in the lateral direction perpendicular to the traveling direction of the vehicle 1) is smaller than or equal to the threshold Gt, that is, the variation in the steering angle of the vehicle 1 falls within the range of the first thresholds Vt to −Vt. Thus, in order for the variation in lateral G not to make an occupant experience a discomfort even when the turning radius of the vehicle 1 increases, by setting the switching position in the moving path of the vehicle 1, it is possible to move the vehicle 1 to the target position. The switching position may be regarded as a position at which the traveling direction of the vehicle is changed between a forward direction and a reverse direction.

Figure 14:
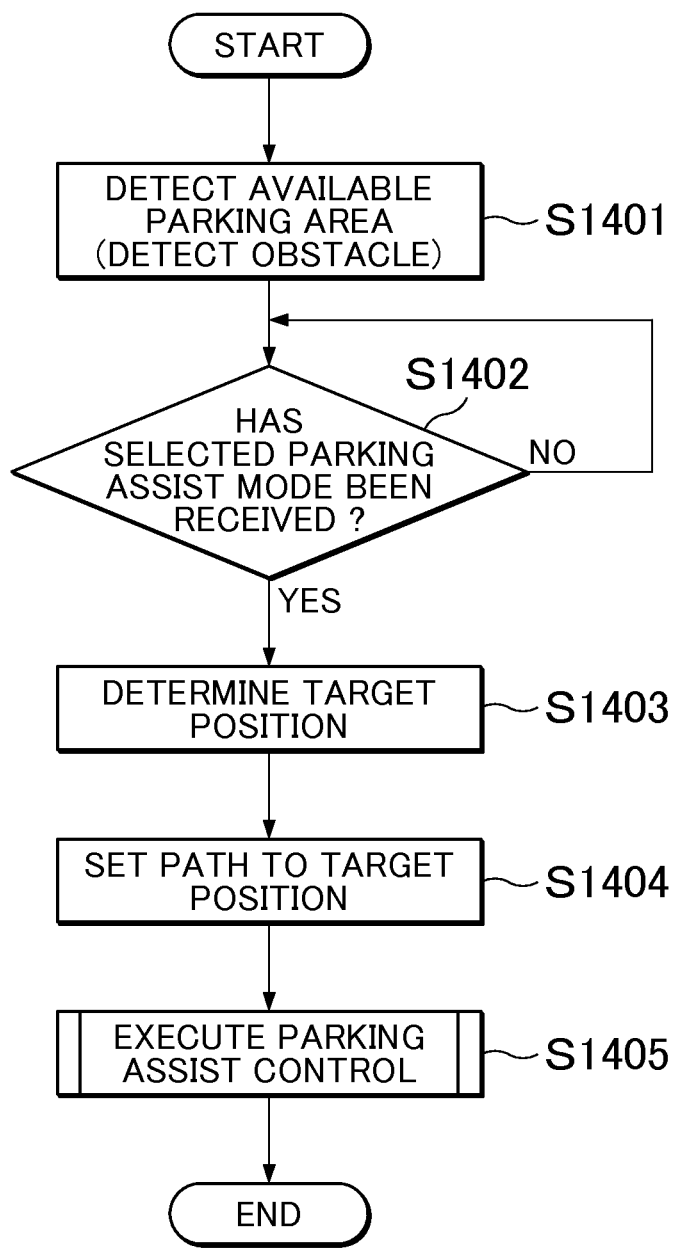
FIG. 14 is a flowchart that shows a process until the process shifts into parking assist control in the ECU according to the embodiment.

Next, a process until the process shifts into parking assist control in the ECU 14 of the vehicle 1 according to the present embodiment will be described. FIG. 14 is a flowchart that shows the procedure of the above-described process in the ECU 14 according to the present embodiment.

Initially, the detection unit 502 detects an obstacle and also detects an area in which the vehicle 1 is allowed to be parked on the basis of the measured distance information acquired by the sensor information acquisition unit 501 (step S1401).

The ECU 14 determines whether a selected parking assist mode has been received from the driver via the operation input unit 10 (step S1402). When the ECU 14 determines that a selected parking assist mode has not been received from the driver (No in step S1402), an obstacle, or the like, is detected in step S1401 again on the assumption that the vehicle 1 continues ordinary traveling.

On the other hand, when the ECU 14 determines that a selected parking assist mode has been received from the driver via the operation input unit 10 (Yes in step S1402), the target position setting unit 503 sets a target position for parking the vehicle 1 from among the available parking area detected in step S1401 (step S1403). In the present embodiment, when there are a plurality of the available parking areas, the available parking area is selected by the driver and received; however, the target position setting unit 503 may automatically select the available parking area.

The path setting unit 504 sets a moving path to the target position of the vehicle 1 (step S1404). The moving path that is set in step S1404 may be a moving path without consideration of the current speed of the vehicle 1. For example, when the vehicle 1 is stopped, the path setting unit 504 sets the moving path on the assumption that the vehicle 1 moves at, for example, a speed of 1 km/h.

The ECU 14 executes parking assist control for moving the vehicle 1 to the target position on the basis of the set moving path (step S1405).

Figure 15:
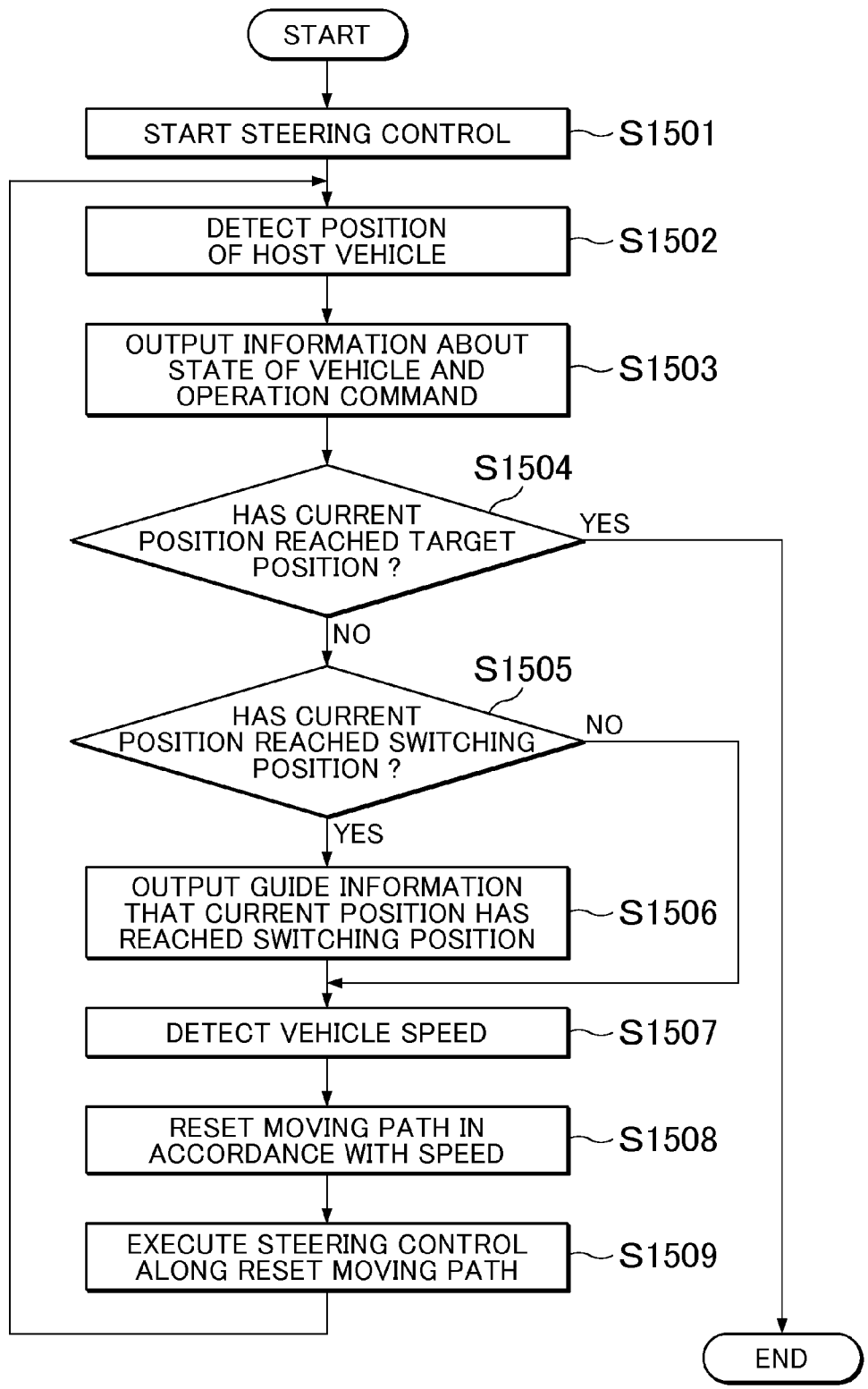
FIG. 15 is a flowchart that shows the procedure of parking assist control in the ECU according to the embodiment.

Thus, parking assist control is started by the ECU 14. Next, parking assist control that is executed in step S1405 of FIG. 14 in the ECU 14 of the vehicle 1 according to the present embodiment will be described. FIG. 15 is a flowchart that shows the procedure of the above-described process in the ECU 14 according to the present embodiment.

Initially, the steering control unit 507 starts steering control along the moving path set by the path setting unit 504 (step S1501).

Subsequently, the position detection unit 505 detects the current position of the vehicle 1 on the basis of the various pieces of information acquired by the sensor information acquisition unit 501 (step S1502).

The output control unit 506 outputs information about the state of the vehicle 1 and guide information including an operation command to the display device 12 on the basis of the detected current position (step S1503). Thus, the driver performs an operation, such as depression of the accelerator or the brake and change of a shift, in accordance with the operation command.

Subsequently, the ECU 14 determines whether the current position of the vehicle 1 has reached the target position (step S1504). When it is determined that the current position has not reached the target position (No in step S1504), it is determined whether the current position of the vehicle 1 has reached a switching position (step S1505). When it is determined that the current position has not reached the switching position (No in step S1505), the process proceeds to step S1507.

On the other hand, when the ECU 14 determines that the current position of the vehicle 1 has reached the switching position (Yes in step S1505), the output control unit 506 outputs, to the display device 12, guide information indicating that the vehicle 1 has reached the switching position (step S1506). The guide information includes a guide to depress the brake or a guide to change a shift.

The sensor information acquisition unit 501 detects the current speed of the vehicle 1 (step S1507). After that, the path setting unit 504 resets a moving path according to the speed of the vehicle 1 (step S1508). In resetting the moving path, the moving path is set such that the steering speed does not exceed the upper limit value of the steering speed corresponding to the speed of the vehicle 1. The moving path corresponding to the detected speed is reset at predetermined time intervals. It is conceivable that an example of the predetermined time intervals is, for example, intervals of one second, or the like.

Subsequently, the steering control unit 507 executes steering control along the reset moving path (step S1509). After that, the process is started again from step S1502.

When the ECU 14 determines in step S1504 that the current position of the vehicle 1 has reached the target position (Yes in step S1504), the process is ended.

According to the above-described procedure, the moving path is set such that the steering speed does not exceed the steering speed associated with the speed of the vehicle, so it is possible to achieve moving control over the vehicle 1 such that the variation in lateral G does not exceed the predetermined threshold.

In the above-described embodiment, an example in which the moving path of the vehicle 1 is set in response to the speed of the vehicle 1 such that the variation in the inertial force in the lateral direction of the vehicle 1 is smaller than or equal to the predetermined threshold is described; however, setting of the moving path is not limited to a method of setting the moving path in response to the speed of the vehicle 1. The moving path may be set in response to the state of the vehicle. For example, it is also applicable to the case where the moving path is set on the basis of the acceleration, or the like, of the vehicle 1.

As described above, according to the above-described embodiment, by setting the moving path in response to the state (for example, speed) of the vehicle 1, it is possible to inhibit application of a large change in lateral G to an occupant on the vehicle 1, so a ride comfort is provided to an occupant.

Some embodiments of the invention are described above; however, these embodiments are only illustrative and not intended to limit the scope of the invention. These novel embodiments may be implemented in other various forms, and may be variously omitted, replaced or changed without departing from the spirit of the invention. The scope and spirit of the invention encompass these embodiments and their modifications, and the invention described in the appended claims and equivalents thereof encompass these embodiments and their modifications.

A control system for a vehicle according to an embodiment of the invention, for example, includes an electronic control unit (e.g., ECU 14) configured to acquire first information indicating a situation of the vehicle at the time when the vehicle is traveling, and set a path for guiding the vehicle to a target position on the basis of the first information such that a variation in an inertial force in a lateral direction perpendicular to a traveling direction of the vehicle is smaller than or equal to a first threshold. With the above control system, for example, it is possible to suppress the variation in the inertial force in the lateral direction, so it is possible to provide a ride comfort to an occupant.

In the control system, for example, the electronic control unit is configured to further set a switching position in a path for guiding the vehicle to the target position in order to set the path such that the variation in the inertial force in the lateral direction perpendicular to the traveling direction of the vehicle is smaller than or equal to the first threshold, and the traveling direction of the vehicle is changed at the switching position. Thus, for example, the switching position is set in the path, so it is possible to move the vehicle to the target position.

A control system for a vehicle according to another embodiment of the invention, for example, includes an electronic control unit (e.g., ECU 14) configured to acquire first information indicating a situation of the vehicle at the time when the vehicle is traveling and steering angle information in the vehicle, and set a path for guiding the vehicle to a target position such that a variation in a steering angle of the vehicle per unit time is smaller than or equal to a first threshold, and the variation in the steering angle of the vehicle per unit time is determined on the basis of the steering angle information and the situation of the vehicle, indicated by the first information. Thus, for example, it is possible to suppress the variation in the inertial force in the lateral direction, so a ride comfort is provided to an occupant.

In the control system according to the other embodiment, for example, the electronic control unit is configured to further set a switching position in a path for guiding the vehicle to the target position in order to set the path such that the variation in the steering angle of the vehicle, indicated by the steering angle information, is smaller than or equal to the first threshold, and the traveling direction of the vehicle is changed at the switching position. According to the above embodiment, for example, the switching position is set in the path, so it is possible to move the vehicle to the target position.

In the control system according to the above embodiments, for example, the electronic control unit is configured to acquire a speed of the vehicle as the situation of the vehicle (first information). Thus, by setting the path of the vehicle in accordance with the speed of the vehicle, it is possible to suppress the variation in the inertial force in the lateral direction, so it is possible to provide a ride comfort to an occupant.

What is claimed is:

1. A control system for a vehicle, comprising:
an accelerator; and
an electronic control unit configured to
acquire a speed of the vehicle at the time when the vehicle is traveling,
set a path for guiding the vehicle to a target position on the basis of the speed of the vehicle such that a variation in inertial force in a lateral direction perpendicular to a traveling direction of the vehicle is smaller than or equal to a first threshold;
reset the path for guiding the vehicle to the target position on the basis of the speed of the vehicle at predetermined time intervals such that the variation in the inertial force in the lateral direction perpendicular to the traveling direction of the vehicle is smaller than or equal to the first threshold;
execute steering control of the vehicle such that the vehicle moves along the path reset by the electric control unit; wherein the vehicle moves along the reset path by the steering control executed by the electric control unit and by depressing the accelerator.

2. The control system according to claim 1, wherein the electronic control unit is configured to bring the variation in the inertial force in the lateral direction perpendicular to the traveling direction of the vehicle to the first threshold or smaller by setting the path such that a steering angle of the vehicle when the speed of the vehicle is high is smaller than the steering angle of the vehicle when the speed of the vehicle is low.

3. The control system according to claim 1, wherein
the electronic control unit is configured to further set a switching position in a path for guiding the vehicle to the target position in order to set the path such that the variation in the inertial force in the lateral direction perpendicular to the traveling direction of the vehicle is smaller than or equal to the first threshold, and the traveling direction of the vehicle is changed at the switching position.

4. A control method for a vehicle, comprising:
acquiring a speed of the vehicle at the time when the vehicle is traveling; and
setting a path for guiding the vehicle to a target position on the basis of the speed of the vehicle such that a variation in an inertial force in a lateral direction perpendicular to a traveling direction of the vehicle is smaller than or equal to a first threshold;
resetting the path for guiding the vehicle to the target position on the basis of the speed of the vehicle at predetermined time intervals such that the variation in the inertial force in the lateral direction perpendicular to the traveling direction of the vehicle is smaller than or equal to the first threshold;
executing steering control of the vehicle such that the vehicle moves along the reset path;
wherein the vehicle moves along the reset path by depressing an accelerator.

5. The control method according to claim 4, further comprising:
acquiring steering angle information in the vehicle; and
setting the path for guiding the vehicle to the target position such that a variation in a steering angle of the vehicle per unit time is smaller than or equal to a second threshold, the variation in the steering angle of the vehicle per unit time being determined on the basis of the steering angle information and the speed of the vehicle, wherein
when the variation in the steering angle is smaller than or equal to the second threshold, the variation in the inertial force is set to a value smaller than or equal to the first threshold.

* * * * *